United States Patent [19]

McCoy

[11] Patent Number: 4,687,384

[45] Date of Patent: Aug. 18, 1987

[54] HAND TAPPING DEVICE

[76] Inventor: David A. McCoy, 3912 Eileen Rd., Dayton, Ohio 45429

[21] Appl. No.: 810,406

[22] Filed: Dec. 18, 1985

[51] Int. Cl.⁴ .............................................. B23G 1/28
[52] U.S. Cl. ..................................... 408/16; 408/714; 10/129 M; 10/135 R; 10/139 R
[58] Field of Search ............ 10/129 P, 129 R, 129 M, 10/133, 135 R, 139 R; 408/16, 116, 714

[56] References Cited

U.S. PATENT DOCUMENTS

| | | |
|---|---|---|
| 1,346,235 | 7/1920 | Muller . |
| 2,286,088 | 6/1942 | Marrell .................... 408/241 |
| 2,985,899 | 5/1961 | Elliott ..................... 408/226 |
| 3,364,510 | 1/1968 | Johnson ................... 10/129 R |
| 3,456,534 | 7/1969 | Williams .................. 408/241 |
| 3,653,780 | 4/1972 | Ammatuna ............... 408/241 |
| 4,274,768 | 6/1981 | Kato ....................... 408/142 |

FOREIGN PATENT DOCUMENTS

| | | | |
|---|---|---|---|
| 1432647 | 12/1966 | France ................... | 10/129 M |
| 435923 | 10/1967 | Switzerland ............. | 408/16 |

Primary Examiner—Z. R. Bilinsky
Assistant Examiner—A. Dougas
Attorney, Agent, or Firm—Robert L. Deddens

[57] ABSTRACT

A hand tapping device has a driving rod at one end provided with a handle and a chuck at the other end for holding a tap. A housing located between the rod and chuck is attached at one end to the rod for axial movement and at the other end to the chuck. A sleeve attached to the rod provides a guide for axial movement of the housing in response to rotation of the rod to effect cutting threads by the tap as the housing expands from the rod and sleeve with a progressively reducing force exerted by a spring located within the housing. At the same time, a graduated scale on the outer surface of the housing indicates the distance the housing moves outwardly from the sleeve and the corresponding depth of the tapped threads.

3 Claims, 7 Drawing Figures

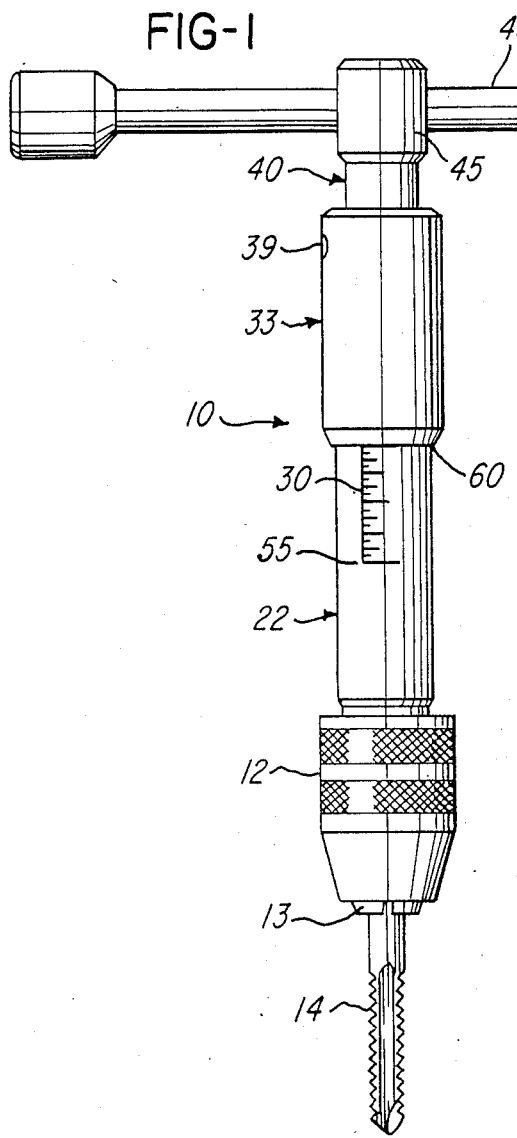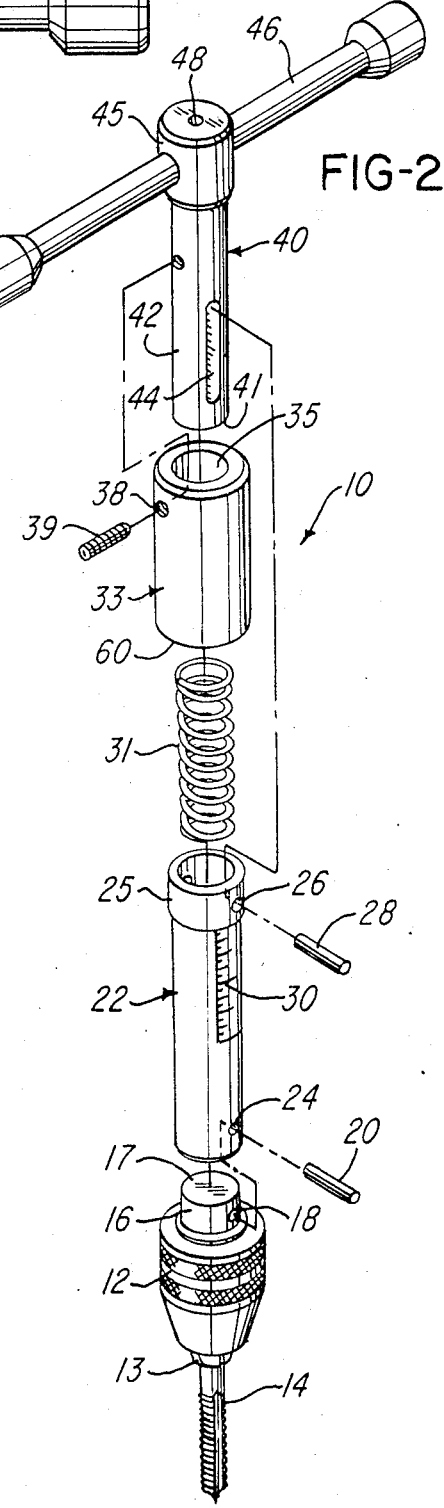

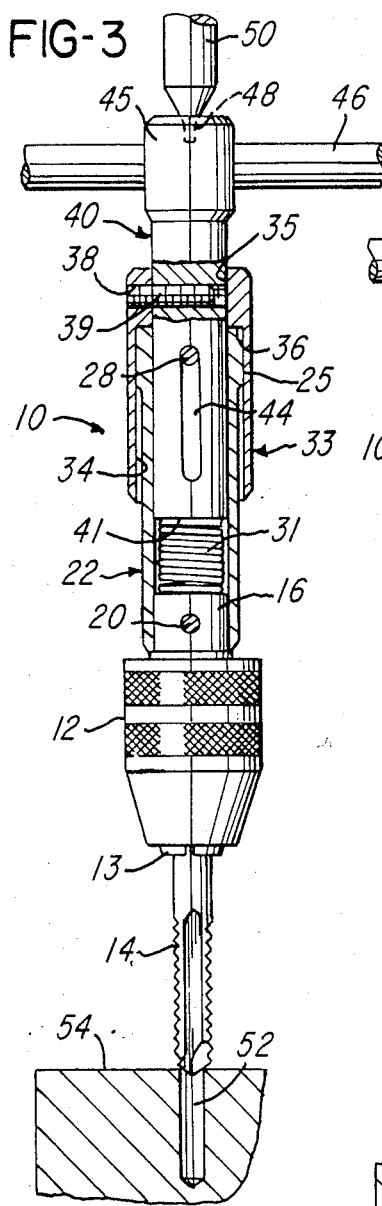
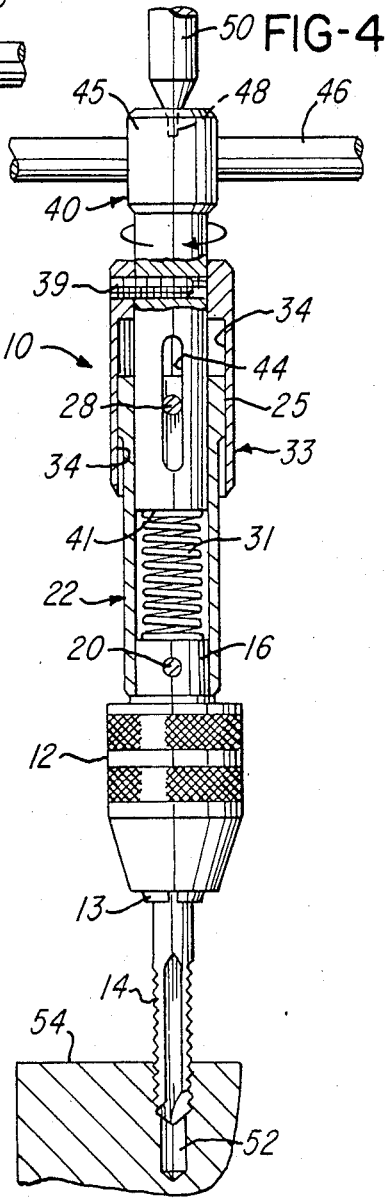
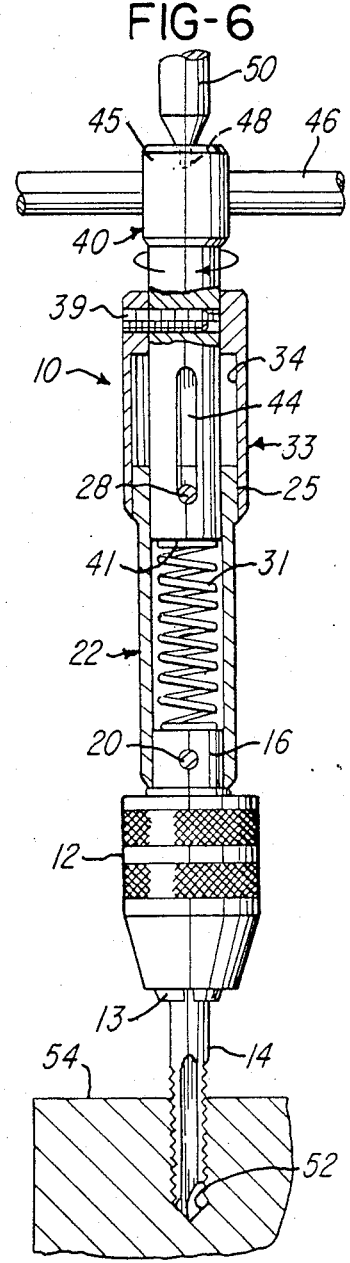
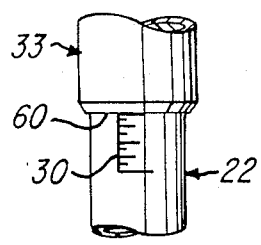
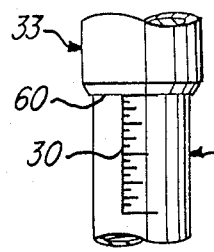

HAND TAPPING DEVICE

BACKGROUND OF THE INVENTION

This invention relates to an improved hand tapping device for cutting threads in the walls defining holes or openings in workpieces. The device may be used in cooperation with the spindle of a drilling machine to provide alignment of the tap with the opening being tapped.

In conventional hand tap wrenches, the spindle of a drilling machine is sometimes used to hold a male center which is brought into contact with a female opening on the tap wrench to align the tap with the hole within the workpiece. As the tap wrench is turned to effect the tapping operation, the tap wrench advances proportionately toward the opening being tapped.

As a result, the machine operator must continuously move the machine spindle downwardly to maintain pressure from the machine spindle on the tap wrench to assure continued alignment during the tapping operation. This requires the operator to turn the tap wrench with one hand and to lower the spindle with the other hand. Due to this cumbersome requirement, often the tap comes out of alignment causing a misaligned tap or a broken tap.

SUMMARY OF THE INVENTION

The present invention is directed to an improved hand tapping device for cutting threads in the walls defining openings in workpieces and which makes hand-tapping easier, more accurate, and saves man hours.

A primary object of the invention is to eliminate the need for the operator to advance the machine spindle continuously toward the workpiece as the tap enters the workpiece, and thereby eliminate misaligned threads and broken taps.

A further object of the invention is to provide a device, part of which will remain in a fixed position relative to the workpiece during the tapping operation, and part of which is spring loaded toward the workpiece as the tap enters the hole or opening within the workpiece.

A further object is to provide automatic, continuous alignment from spindle to workpiece.

A further object is to provide means to enable the operator to determine and control continuously the depth of the tap within the opening being tapped.

Other features, objectives and advantages of the invention will be apparent from the following description and accompanying drawings.

BRIEF DESCRIPTION OF DRAWINGS

FIG. 1 is an elevational side view of a tapping device constructed in accordance with a preferred embodiment of the invention and showing a depth gauge scale on the body thereof;

FIG. 2 is an exploded perspective view illustrating the parts of the tapping device shown in FIG. 1;

FIG. 3 is an elevational view with portions of the device being cut away and illustrating the device in its starting position prior to the tapping operation;

FIG. 4 is an elevational view with portions of the device being cut away and illustrating the tap in partially extended position within the opening being tapped;

FIG. 5 is a fragmentary view of the device illustrating the position of the depth gauge when the tap is in the partially extended position shown in FIG. 4;

FIG. 6 is an elevational view with portions of the device being cut away and illustrating the tap and device in fully extended position; and FIG. 7 is a fragmentary view of the device illustrating the position of the depth gauge when the tap and device are in fully extended position shown in FIG. 6.

DESCRIPTION OF THE PREFERRED EMBODIMENT

Referring to FIG. 1, a hand-tapping device 10 of the invention is shown in a vertical elevation. With reference to FIGS. 1 and 2, the device 10 includes an adjustable tap chuck 12 having gripping means 13 for gripping and receiving a standard tap 14. The chuck 12 has an upper cylindrical portion 16 having a flat-top surface 17 and a cylindrical cross bore 18 for receiving a lock pin 20.

A cylindrical tubular housing 22 is provided with diametrically opposed holes 24 for receiving the lock pin 20 which secures the housing 22 to the chuck 12 after the cylindrical portion 16 of the chuck 12 is inserted within the lower end of the housing 22. The upper end of the housing 22 has a slightly enlarged cylindrical portion 25 which has an outside diameter slightly larger than the outside diameter of the lower end portion of the housing 22. The central portion of the housing 22 is provided with an axially extending graduated scale 30 (FIG. 2) on its outer surface.

The upper portion 25 of the housing 22 is provided with diametrically opposed holes 26 for receiving a cross pin 28 which secures the housing 22 to a driving rod 40 which is described below. The pin 28 is preferrably of a length which will be flush with the outer surface of the upper portion 25.

A compression spring 31 is positioned within the housing 22, with its lower end bearing against the top surface 17 of the chuck 12 and with its upper end bearing against the bottom surface 41 of the driving rod 40.

Referring to FIGS. 2 and 3, the device 10 further includes a cylindrical tubular sleeve 33 having an inner cylindrical bore 34 (FIG. 3) which slideably receives and engages the upper portion 25 of the housing 22. This arrangement provides an axially slideable guide enabling the upper portion 25 of the housing 22 to move axially within the inner bore 34 of the sleeve 33 and on the outer cylindrical surface 42 of the driving rod 40.

The upper portion of the sleeve 33 has a hole or bore 35 (FIG. 3) for receiving the driving rod 40. The lower end of the bore 35 cooperates with the upper end of the bore 34 to define a shoulder 36 which forms a stop for the movement of the housing 22 within the sleeve 33. The upper portion of the sleeve 33 is also provided with a tapped hole 38 for receiving a set screw 39 which secures the sleeve 33 to the rod 40.

The lower portion 42 of rod 40 is cylindrical and has an axially extending slot 44 for receiving the pin 28, thereby permitting the housing 22 to move axially between the upper end of the slot and the lower end of the slot, defining the limits of motion of the housing 22 on the rod 40. The upper portion 45 of the rod 40 is provided with a tapped hole 38 (FIG. 4) for receiving the set screw 39 passing through the sleeve 33. A handle 46, preferably in the form of a metal bar, extends through the upper portion 45 of the driving rod 40 and is adapted to be gripped and turned to rotate the rod 40.

Upon rotation of the handle 46 in a clockwise direction, as shown by the arrow in FIG. 4; the rod 40 turns the sleeve 33 and also turns the housing 22 which rotates the chuck 12 and the tap 14. The upper portion of the driving rod 40 is provided with a female opening or recess 48 (FIG. 2), for receiving a male center tool 50 which would normally be attached to the spindle of a drilling machine (not shown).

In operation of the device 10 and referring to FIGS. 3–7, the operator attaches the male center tool 50 to the spindle of a machine and also attaches a tap 14 to the chuck 12 of the device 10. He then places the device 10 over the open end of a hole or bore 52 already provided or drilled within a workpiece 54. The object of the operation is to cut threads or thread the bore 52 in the workpiece 54.

The operator then lowers the machine tool or drill spindle (not shown) to engage the center tool 50 with the recess 48 within the top end of the driving rod 40. The spindle is then lowered further to force the rod 40 downwardly to compress the spring 31 within the housing 22. The housing 22 moves upwardly within the sleeve 33 until it engages the shoulder 36, as can be seen from FIG. 3. In this position, the pin 28 contacts the upper end of slot 44.

When the housing 22 is advanced or shifted upwardly to its starting position (FIG. 3), the bottom of the sleeve 33 is positioned at the lower end of the scale 30, at point 55 (FIG. 1). Also, the spring 31 biases the housing 22, chuck 12, and the tap 14 toward the bore 52 in the workpiece 54.

The operator will have already measured the depth of the bore 52, or the depth to which the bore is to be tapped, and will then be ready to begin the tapping operation with the device 10 firmly positioned and properly aligned between the spindle (not shown) and the workpiece 54. Initially, the scale 30 is hidden by the sleeve 33. The operator then turns the handle 46 until the cutting teeth of the end portion of the tap 14 enters the bore 52 to form a bite in the workpiece.

As the operator continues to turn the handle 46 to continue the thread cutting or tapping operation, the downward pressure exerted by the spring 31 urges the tap 14 into the bore 52. As the handle is turned, the tap forms threads in the workpiece 54, the tap 14 is drawn into the bore 52 as the threads are formed, and the scale 30 begins to be exposed by the movement of the housing 22 toward the workpiece.

As the spring 31 expands (FIG. 4), the sleeve 33, the housing 22, the chuck 12 and the tap 14 rotate together. The housing 22 and the chuck 12 continue to advance toward the workpiece as the tap 14 enters the workpiece. The driving rod 40 and the sleeve 33 remain in an axially fixed position relative to the workpiece. As the housing 22 moves the sleeve 33 toward the workpiece 54 and the tap 14 enters the workpiece, the operator is able to measure the distance of travel of the tap 14 into the workpiece 54 by the distance of movement of the housing 22, which is measured on the graduated scale 30. The operator is thereby able to determine the point at which he should stop the tapping operation when the desired length of travel of the tap 14 within the bore 52 has been accomplished.

Referring to FIGS. 4 and 5, it can be seen that when the tap 14 is partially threaded into the workpiece 54 (FIG. 4), the scale 30 has been exposed a like-distance, and this measurement is exhibited on the side of the housing 22 at the bottom surface 60 of the sleeve 33 (FIG. 5). Similarly, when the tap 14 has advanced into the workpiece 54 the full distance within the slot 44 (FIG. 6), the bottom surface 60 of sleeve 33 will be aligned with the top of the scale 30 (FIG. 7).

During the tapping operation, the pin 28 slides downwardly within the slot 44 and moves from its uppermost position at the top of the slot 44 downwardly toward its lowermost position at the bottom of the slot 44 (FIG. 6). The upper portion 25 of the housing 22 is slightly greater in diameter than the lower portion of the housing 22 so that when the housing 22 moves within the sleeve 33, the sleeve 33 will not scratch or abrade the scale 30.

The device 10 may be used to tap holes having a depth greater than the axial movement of the pin 28 within the slot 44. After the tap 14 has reached its limit of extension (FIG. 6), the operator simply advances the machine and spindle toward the workpiece to compress the spring 31 again, as shown in FIG. 3. The operator then repeats the procedure. Thus, the device 10 may be used to control the tapping of varying lengths of holes.

To extract the tap 14 from the workpiece, the operator reverses the direction of rotation of the handle 46. This will retract the housing 22 into the sleeve 33 and compress the spring 31. When the tap 14 reaches the top of the tapped hole it will disengage from the cut threads, and the operator then retracts the spindle to permit removal of the device.

As is evident from the foregoing description and drawings, the device 10 may be constructed of different lengths, with slot 44 of different lengths and with scale 30 of different lenths to enable the operator to tap holes of different depths.

While the tapping device herein described constitutes a preferred embodiment of the invention, it is to be understood that the invention is not limited to this precise device, and that changes may be made therein without departing from the scope of the invention.

What is claimed is:

1. A hand operated tap wrench adapted to receive a tap for cutting threads within a bore in a workpiece, the device comprising a tubular housing having first and second end portions, a chuck secured to the first end portion and having means for releasably gripping the tap, a drive rod extending axially into the second end portion of the tubular housing and disposed for axial sliding movement within the second end portion, means for limiting axial movement of the drive rod within the housing and effective to rotate the housing in response to rotation of the drive rod, a compression spring within the housing and extending between the chuck and the drive rod, a tubular sleeve having a portion mounted on the drive rod and slidably receiving the second end portion of the housing, means for securing the sleeve to the drive rod for rotation with the drive rod and the housing, the housing being movable between a retracted position within the sleeve and a normally extended position projecting from the sleeve, a handle rod secured to the drive rod and extending perpendicular to the drive rod, the handle rod being effective to rotate the drive rod, housing and the sleeve after the drive rod is compressed within the housing against the spring, the tap being effective to cut threads within the bore as the housing slides outwardly on the drive rod and within the sleeve in response to a torque applied to the drive rod by the handle rod and to the force exerted by the spring, the housing having an outer surface with an axially extending graduated scale, and the scale being exposed as the housing moves to its extended position to exhibit on the scale the corresponding depth of the tap within the bore.

2. The tap wrench of claim 1 wherein the means for limiting axial movement of the drive rod comprise a cross pin within the second end portion of the tubular housing, and the drive rod defines an axially extending slot receiving the pin.

3. The tap wrench of claim 1, wherein the drive rod has an end portion defining an axially extending hole for receiving a centering tool positioned in axial alignment with the drive rod.

* * * * *